US012770346B2

(12) United States Patent
Yoshizawa et al.

(10) Patent No.: US 12,770,346 B2
(45) Date of Patent: Oct. 20, 2026

(54) INFORMATION DISPLAY DEVICE AND DISPLAY METHOD

(71) Applicant: Maxell, Ltd., Kyoto (JP)

(72) Inventors: Kazuhiko Yoshizawa, Kyoto (JP); Hitoshi Akiyama, Kyoto (JP); Yasunobu Hashimoto, Kyoto (JP)

(73) Assignee: Maxell, Ltd., Kyoto (JP)

( * ) Notice: Subject to any disclaimer, the term of this patent is extended or adjusted under 35 U.S.C. 154(b) by 126 days.

(21) Appl. No.: 18/867,982

(22) PCT Filed: Jun. 8, 2022

(86) PCT No.: PCT/JP2022/023034

§ 371 (c)(1),
(2) Date: Nov. 21, 2024

(87) PCT Pub. No.: WO2023/238264

PCT Pub. Date: Dec. 14, 2023

(65) Prior Publication Data

US 2026/0195998 A1 Jul. 9, 2026

(51) Int. Cl.
*G06T 19/00* (2011.01)
*G02B 27/00* (2006.01)
(Continued)

(52) U.S. Cl.
CPC ........ *G06T 19/006* (2013.01); *G02B 27/0093* (2013.01); *G02B 27/017* (2013.01);
(Continued)

(58) Field of Classification Search
None
See application file for complete search history.

(56) References Cited

U.S. PATENT DOCUMENTS 10,175,483 B2 * 1/2019 Salter .................. G02B 27/017
12,026,800 B1 * 7/2024 Salter ........................ G06T 3/02
(Continued)

FOREIGN PATENT DOCUMENTS

JP 2016-110319 A 6/2016
JP 2018-005517 A 1/2018
(Continued)

OTHER PUBLICATIONS

International Search Report (with English translation) and Written Opinion dated Aug. 16, 2022, from corresponding International Application No. PCT/JP2022/023034, 8 pages.

*Primary Examiner* — Nurun Flora
(74) *Attorney, Agent, or Firm* — RIMON P.C.

(57) ABSTRACT

An information display device includes a display, an object data acquisition unit acquiring information about an AR object and generating an AR object, an additional object generation unit generating an additional object related to the AR object, a posture detection unit detecting the tilt of the information display device, and a display control unit displaying the AR object to be tilted according to the tilt of the information display device, displaying the additional object so that it is tilted on the display in accordance with the tilt of the information display device when the tilt of the information display device is less than the predetermined value, and displaying the additional object without tilting it, using the same vertical reference as the display, regardless of the tilt of the information display device when the tilt of the information display device is above the predetermined value.

14 Claims, 10 Drawing Sheets

(51) Int. Cl.

| | |
|---|---|
| ***G02B 27/01*** | (2006.01) |
| ***G06F 1/16*** | (2006.01) |
| ***G06F 3/01*** | (2006.01) |
| ***G06F 3/04845*** | (2022.01) |

(52) U.S. Cl.

CPC ............ *G06F 1/1694* (2013.01); *G06F 3/012* (2013.01); *G06F 3/04845* (2013.01)

(56) References Cited

U.S. PATENT DOCUMENTS

| | | | | |
|---|---|---|---|---|
| 2015/0130837 | A1 | 5/2015 | Ishikawa et al. | |
| 2017/0329480 | A1 | 11/2017 | Ishikawa et al. | |
| 2019/0346933 | A1* | 11/2019 | Medina | G06F 1/1694 |
| 2021/0225041 | A1* | 7/2021 | Nichols | G01B 21/16 |
| 2022/0407902 | A1* | 12/2022 | Rubin | H04N 7/152 |
| 2023/0185365 | A1* | 6/2023 | Rahman | G02B 27/0093 345/156 |
| 2023/0351676 | A1* | 11/2023 | Huang | G06T 15/20 |
| 2024/0265656 | A1* | 8/2024 | Victor-Faichney | G06F 3/011 |

FOREIGN PATENT DOCUMENTS

| | | | |
|---|---|---|---|
| WO | 2014/129204 | A1 | 8/2014 |
| WO | 2019/163031 | A1 | 8/2019 |

* cited by examiner

FIG. 9A

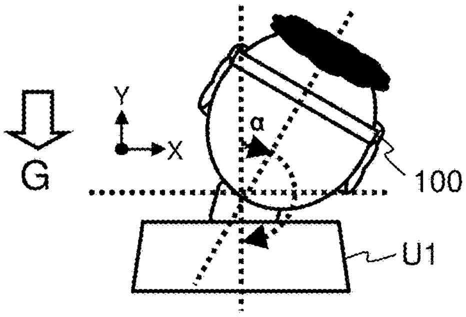

FIG. 9B

| Tilt of HMD (α) | AR object display | additional object display |
|---|---|---|
| 0≦α <predetermined value | Display based on the virtual space gravity direction, regardless of the HMD tilt | Display based on the virtual space gravity direction, regardless of the HMD tilt |
| predetermined value≦α | Display based on the virtual space gravity direction, regardless of the HMD tilt | Display in accordance with HMD tilt (so that the relative tilt with information display device becomes 0) |

FIG. 10

| Tilt of HMD (α) | AR object display | additional object display |
|---|---|---|
| 0≦α <predetermined value 1 | Display based on the virtual space gravity direction, regardless of the HMD tilt | Display with a slope of (predetermined value 1÷2) for the real space gravity direction |
| predetermined value1≦α< predetermined value 2 | Display based on the virtual space gravity direction, regardless of the HMD tilt | Display with a slope of [predetermined value 1+{(predetermined value 2-predetermined value 1)/2}] for the real space gravity direction |
| ... | ... | ... |
| predetermined value n≦α≦180 | Display based on the virtual space gravity direction, regardless of the HMD tilt | Display with a slope of [predetermined value n+{(180-predetermined value n)/2}] for the real space gravity direction |

INFORMATION DISPLAY DEVICE AND DISPLAY METHOD

CROSS-REFERENCE TO RELATED APPLICATIONS

This application is the U.S. National Phase under 35 U.S.C. § 371 of International Application No. PCT/JP2022/023034, filed on Jun. 8, 2022, the entire contents of which are hereby incorporated by reference.

TECHNICAL FIELD

This invention relates to information display devices and display methods.

BACKGROUND ART

One of the information display devices is a head mounted display device (hereinafter referred to as HMD: Head Mounted Display), which is a device worn on the head to view information. HMDs can superimpose images of virtual objects (AR objects: Argument Reality Objects) such as images and text in real space and display them for viewing, and their use in gaming and work support applications has been expanding in recent years.

Here, the virtual space that the user sees when wearing the HMD needs to change in response to the user's head movements in order to create a state of immersion in the virtual world.

The background technology in this technical field is Patent Document 1. In Patent Document 1 discloses an image processing device for presenting stereoscopic images by means of an HMD, comprising: a reference image acquiring unit for acquiring a reference image comprising a pair of images for the left eye and images for the right eye representing objects viewed from two viewpoints separated in the horizontal direction; a tilting angle acquiring unit for acquiring a tilting angle of a vertical axis of a head of a user wearing the HMD from a vertical direction in a plane parallel to the screen; an image transformation unit performs a transformation processing to rotate the left-eye image and right-eye image around a common axis in the virtual space including the object based on the tilt angle; and an output unit that outputs the transformed image data for the left eye and the right eye to the HMD.

CITATION LIST

Patent Document

Patent Document 1: International Publication No. 2019/163031

SUMMARY OF THE INVENTION

Problems to be Solved by the Invention

In Patent Document 1, display image control is performed to rotate the image in the display that is similarly tilted according to the tilt angle of the user's head. Therefore, when the user's head is tilted, all images on the display unit viewed from the user's side are tilted. For example, if there is a menu display, the menu display is also tilted, and the menu display is not considered to be difficult to see.

In view of the above issues, it is an object of the present invention to provide an information display device and display method that is easy to use and enables menu displays, etc. to be easily viewed even when the display unit is tilted.

Solutions to Problems

The present invention comprises, to give an example, an information display device having a display unit, an object data acquisition unit that acquires information about an AR object and generates the AR object, an additional object generation unit that generates an additional object related to the AR object, a posture detection unit that detects a tilt of the information display device with respect to a gravity direction of a real space, and a display control unit that displays the AR object so that it is tilted on the display unit according to the tilt of the information display device, displays the additional object so that it is tilted on the display unit according to the tilt of the information display device if the tilt of the information display device is less than a predetermined value, or displays the additional object so that it is not tilted on the display unit with a same vertical reference as the display unit regardless of the tilt of the information display device if the tilt of the information display device is above the predetermined value.

Effects of the Invention

The present invention provides an easy-to-use information display device and display method that enables menu displays, etc. to be easily viewed even when the display unit is tilted.

BRIEF DESCRIPTION OF THE DRAWINGS

FIG. 9A illustrates the additional object display control in Example 1.

FIG. 9B summarizes the display control of AR objects and additional objects according to the user's head inclination α in the state shown in FIG. 9A.

FIG. 10 illustrates the display control of AR objects and additional objects according to the user's head inclination & in Example 2.

MODE FOR CARRYING OUT THE INVENTION

The following examples of the invention will be described using the drawings, with an HMD as an example information display device.

Example 1

Figure 1:
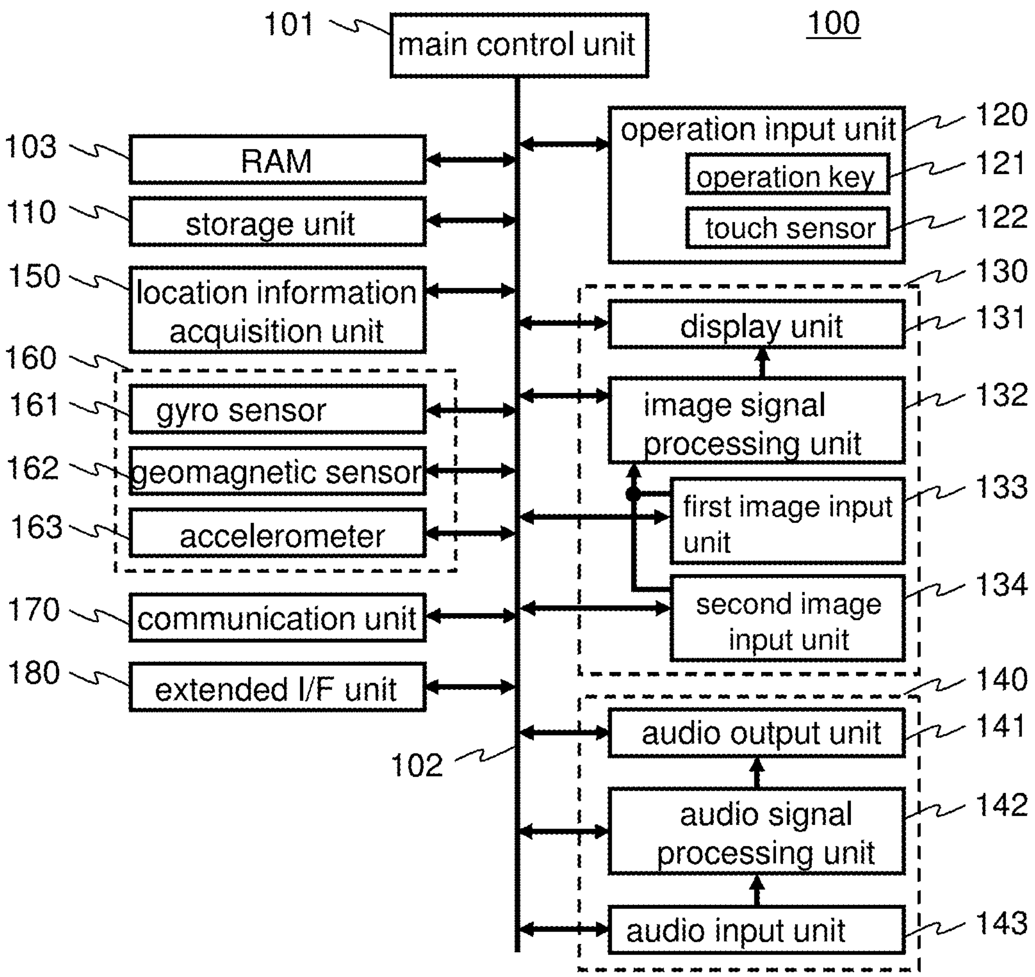
FIG. 1 is a block diagram showing the hardware configuration of the HMD in Example 1.

FIG. 1 shows a block diagram of the hardware configuration of the HMD 100 in this example. In FIG. 1, 101 is the main control unit (CPU/MCU, etc.), 102 is the bus, which is the path for sending and receiving commands and data, 103 is the RAM, which is the work area for executing the basic operation program and other operation programs, 110 is the storage unit, which is a non-volatile storage medium such as Flash ROM/EEPROM/SSD/HDD.

120 is the operation input unit, which is the user operation interface, and has operation keys 121 such as SWs, power and volume keys, and touch sensor 122 such as a touch pad.

130 is an image processing unit such as an image (video) processor, and has a display unit (display) 131, an image signal processing unit (image (video) signal processor) 132, a first image input section 133, an external camera for front-facing photography, and a second image input unit 134, an internal camera for detecting eye movement.

140 is an audio processing unit (audio processor), which has an audio output unit (speaker) 141, an audio signal processing unit (audio signal processor) 142, and an audio input unit (microphone) 143.

150 is a location information acquisition unit (for receiving location information signals such as GPS signals), and 160 is a sensor unit with a gyro sensor 161, a geomagnetic sensor 162, and an accelerometer 163.

170 is a communication unit (communication interface) consisting of a LAN (Wi-Fi (registered trademark)) communication unit, mobile communication unit, Bluetooth (registered trademark) communication unit, etc. 180 is an extended interface unit, such as a USB interface, which is used for data transmission/reception, charging, etc.

Figure 2:
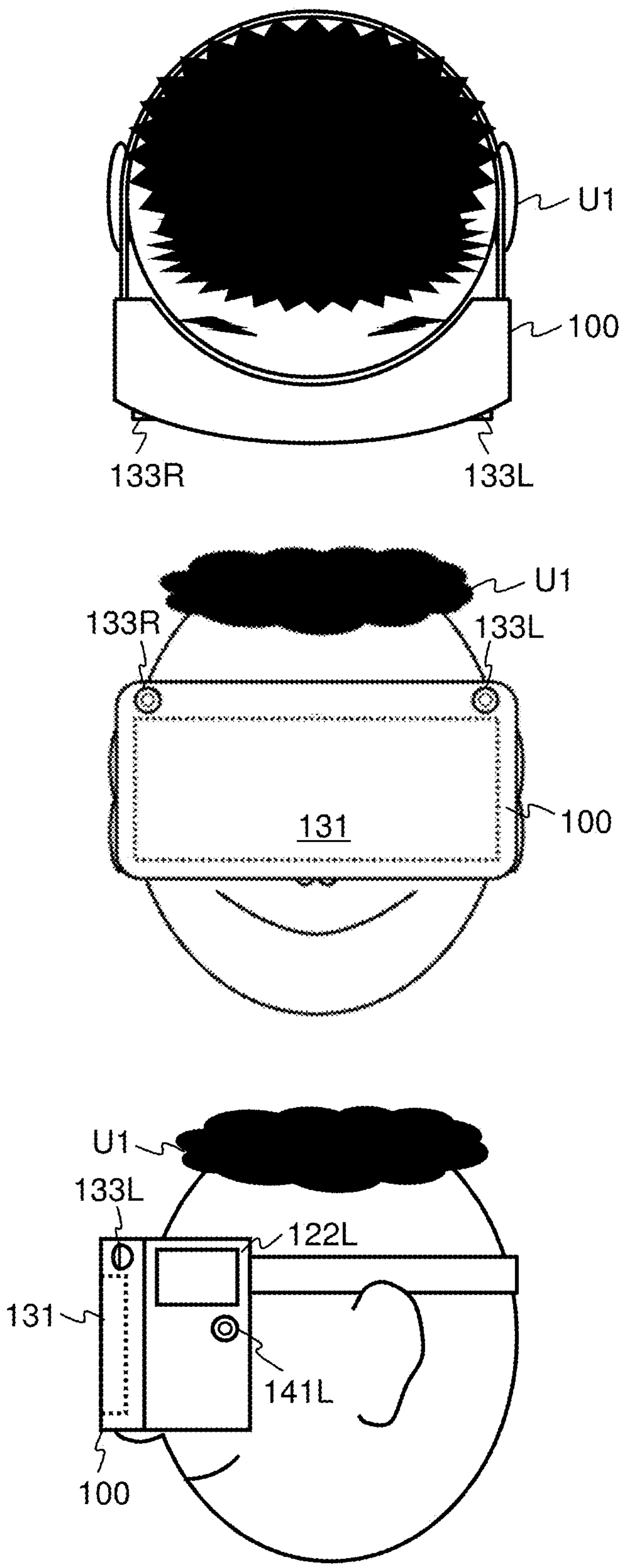
FIG. 2 shows the appearance and mounting of the HMD in Example 1.

FIG. 2 shows the appearance and wearing view of the HMD in this example. In FIG. 2, the upper figure is the top view of the HMD 100 worn on the head of user U1, the middle figure is the front view, and the lower figure is the side view. The HMD 100 in this example, as shown in FIG. 2, is a goggle-type and is a non-transmissive HMD.

In FIG. 2, the display unit 131 is a non-transmissive type, and is placed at a position where the user U1 can see inside the housing of the HMD 100, and the image of the user's field of view acquired by the first image input unit 133, which is an external camera, is displayed on the display unit 131. The display unit 131 may be a transparent type, in which case the outside world can be viewed directly through the display unit 131 by transmission.

133L is the first image input unit (L), which is the left external camera, and 133R is the first image input unit (R), which is the right external camera. Only one first image input section may be provided, for example, one first image input unit 133 may be provided in the center.

In addition, 122L is a touch sensor (L) and 122R is a touch sensor (R) (Figure omitted), and only one touch sensor may be provided on either the left or right side. 141L is an audio output unit (L) (stereo speaker L) and 141R is an audio output unit (R) (stereo speaker R) (Figure omitted). Although not shown in the figure, a monaural microphone may be provided as the audio input unit 143.

Figure 3:
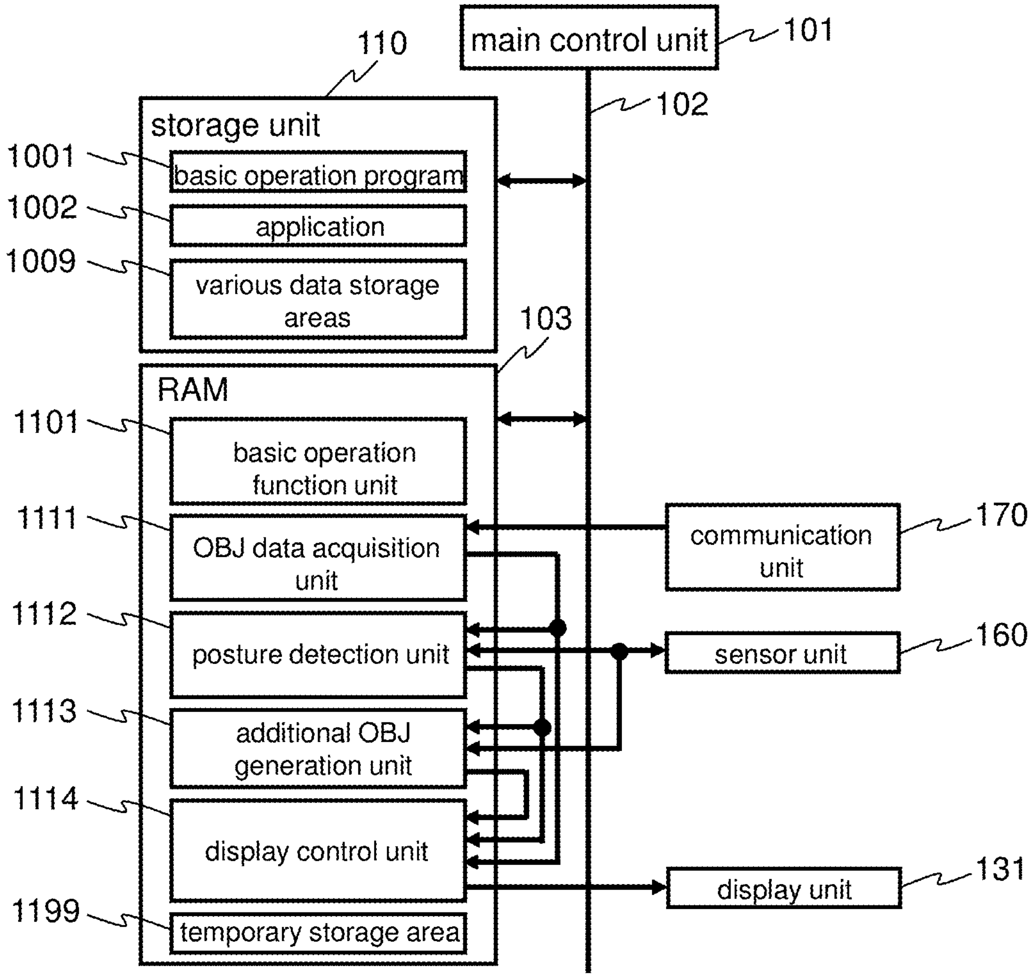
FIG. 3 shows the functional configuration of the HMD in Example 1.

FIG. 3 shows the functional configuration of the HMD in this example. In FIG. 3, the storage unit 110 consists of a basic operation program 1001, which is a basic program such as an OS, application 1002, which includes an application (hereinafter abbreviated as app) that perform the functions of this example and other apps, and various data storage areas 1009, which are areas for storing various operation settings and information (video, still images, sound, etc.).

The program/app stored in storage unit 110 is expanded (loaded) into RAM 103, and the main control unit 101 executes the expanded program/app by software processing to execute the functional part of this example and other functional parts.

In FIG. 3, the RAM 103 lists the executable programs that are deployed by function: the RAM 103 consists of the basic operation function unit 1101 that executes the basic operation program of the HMD 100, an object data acquisition unit 1111 that acquires information about the AR object (objects are sometimes referred to as OBJ) and generates an AR object to be displayed on the display unit 131 of the HMD 100 based on the acquired information, a posture detection unit 1112 detects the tilt of the HMD 100 (tilt of user U1's head) relative to the gravity direction of real space, an additional object generation unit 1113 generates additional information (additional object) related to the AR object generated by the object data acquisition unit 1111, and a display control unit 1114 controls the display mode of the AR object generated by the object data acquisition unit 1111 and the additional object generated by the additional object generation unit 1113 on the display unit 131 based on the gravity direction set in the virtual space where the AR object is placed, the inclination of the HMD 100 relative to the gravity direction of the real space detected by the posture detection unit 1112, and the operation mode of the HMD 100.

RAM 103 also has a temporary storage area 1199 that is a temporary storage area for various information created/obtained by APP.

Figure 4A:
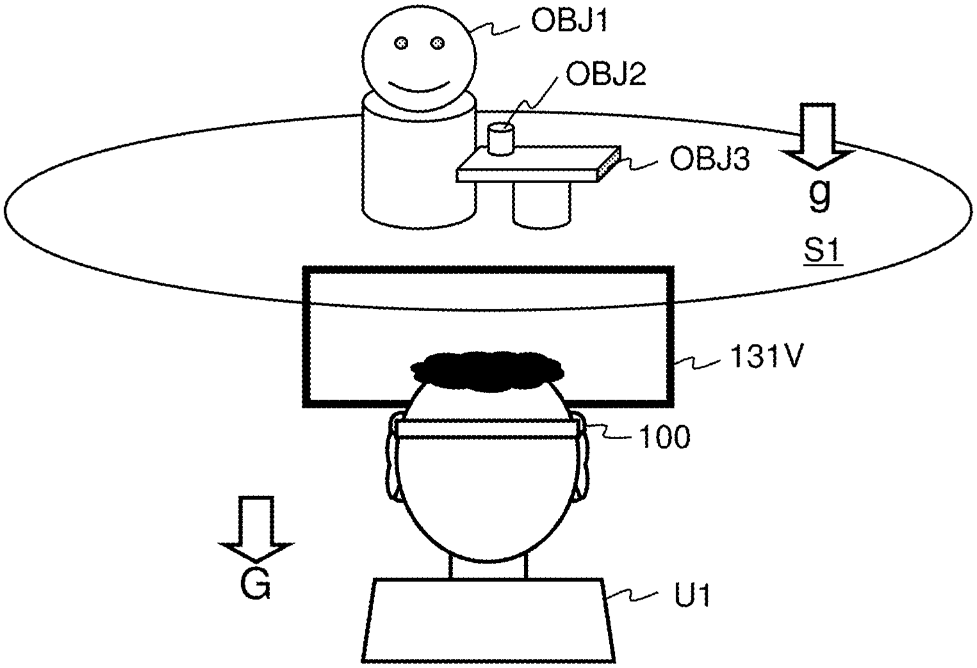
FIG. 4A is a conceptual diagram illustrating the visibility of virtual space by the HMD in Example 1.
Figure 4B:
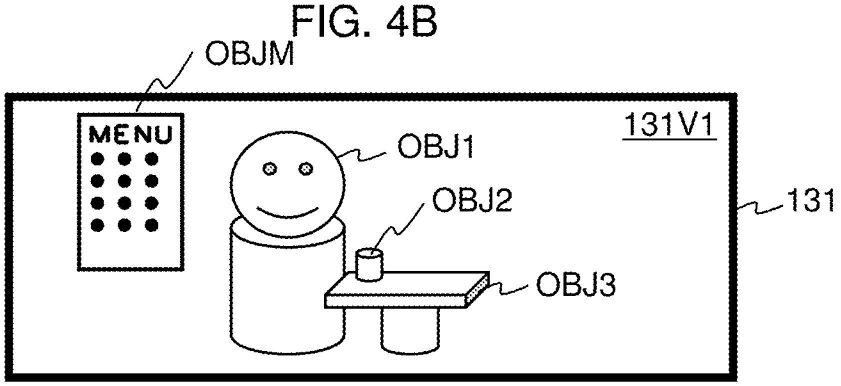
FIG. 4B illustrates the image displayed on the display unit of the HMD in the state shown in FIG. 4A.

FIG. 4A and FIG. 4B are conceptual diagrams illustrating the visibility situation of virtual space by HMD in this example.

In FIG. 4A, user U1 is wearing the HMD 100 in an upright position without tilting his head in the vertical direction, which is the gravity direction G in the real space. In FIG. 4A, virtual space S1 is the space where OBJ1~3 and other objects are placed, and is not limited to within an ellipse.

OBJ1 is an AR object of a person, OBJ2 is an AR object of a cup, and OBJ3 is an AR object of a table, each of which is placed based on the world coordinate system. 131V is the visible range in virtual space S1 that user U1 can see by wearing HMD 100. g is the gravity direction set in virtual space S1 where AR objects OBJ1~3 are placed.

By displaying AR objects OBJ1~3 on the display unit 131 of the HMD 100, user U1 becomes visible to a predetermined range of the virtual space S1 including AR objects OBJ1~3 through the visible range 131V.

FIG. 4B illustrates the image displayed on the display unit of the HMD in the state shown in FIG. 4A. In FIG. 4B, the display unit 131 displays the image 131V1 shown in FIG. 4A. OBJM is an additional object consisting mainly of text, such as a menu or a pop-up for object explanation.

Figure 5A:
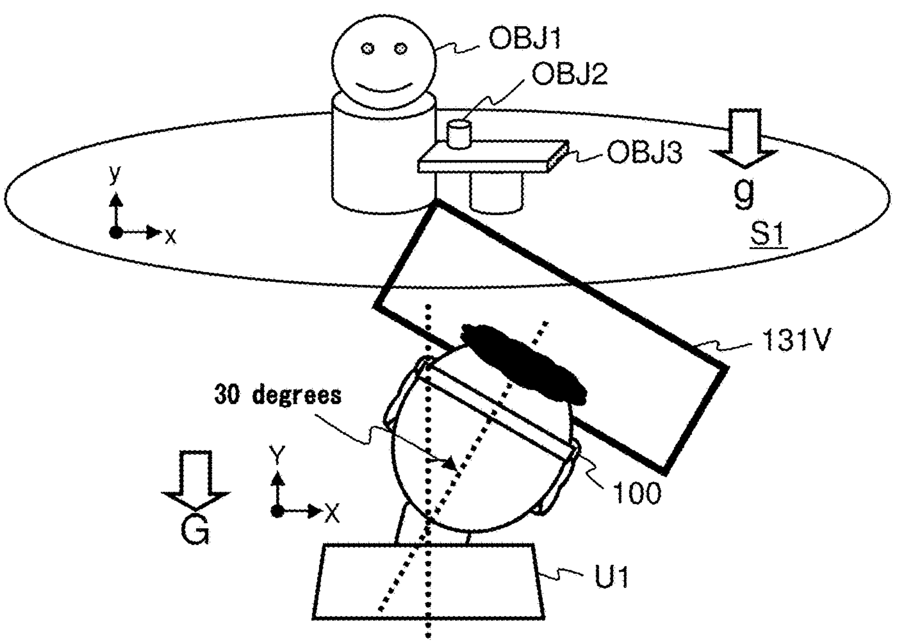
FIG. 5A is a conceptual diagram illustrating the visibility of the virtual space by the HMD when the user's head is tilted 30 degrees in Example 1.
Figure 5B:
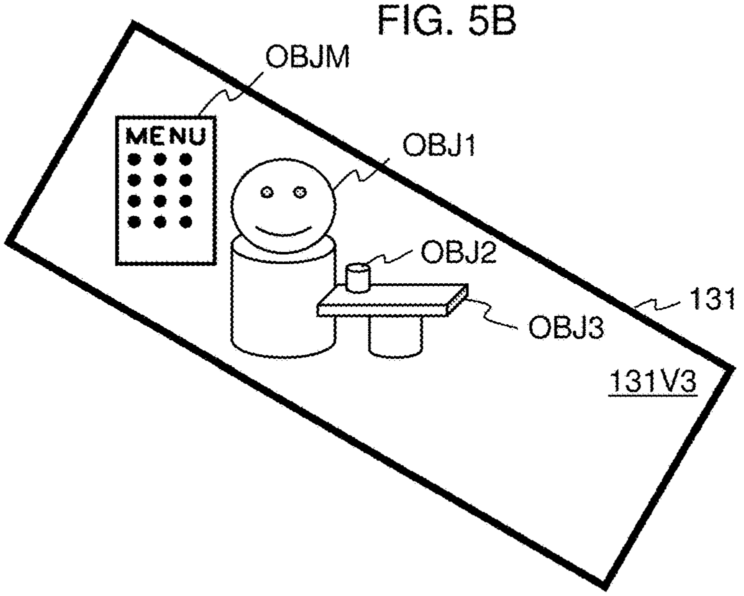
FIG. 5B illustrates the image displayed on the display unit of the HMD with respect to the AR object in the state shown in FIG. 5A.
Figure 5C:
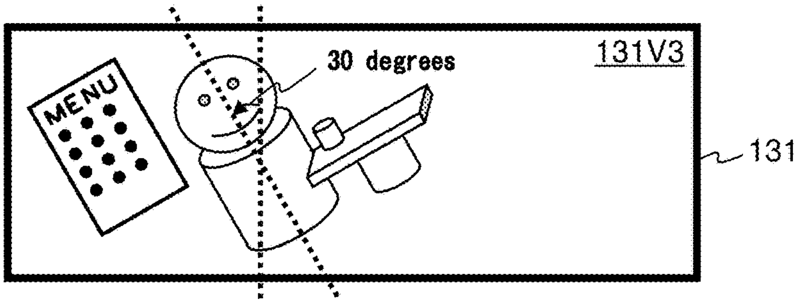
FIG. 5C illustrates the image displayed on the display unit with respect to the display unit of the HMD in the state shown in FIG. 5A.

FIG. 5A, FIG. 5B, and FIG. 5C are conceptual diagrams illustrating the visibility of the virtual space by the HMD when the user's head is tilted 30 degrees in this example.

In FIG. 5A, FIG. 5B, and FIG. 5C, the same configurations as in FIG. 4A and FIG. 4B are marked with the same symbols and their descriptions are omitted. In FIG. 5A, user U1 tilts his/her head 30 degrees to the right from the state in FIG. 4A. In other words, it shows the case where the angle of the vertical axis of the head to the vertical direction in the plane parallel to the display unit 131 is 30 degrees.

When user U1 tilts his/her head 30 degrees to the right, HMD 100 also tilts and visible range 131*v* also tilts 30 degrees to the right, i.e., visible range 131*v* rotates 30 degrees clockwise in the xy-plane of virtual space S1. Each AR object OBJ1~3 and additional object OBJM, which are arranged based on the world coordinate system, are fixed in position in virtual space S1 even if user U1 or visible range 131*v* moves, in order to create a state of immersion in the virtual world. In other words, each AR object OBJ1~3 and additional object OBJM remain displayed with respect to the vertical reference of the gravity direction g of the virtual space.

FIG. 5B shows the state of image 131V3 displayed in display unit 131 in FIG. 5A, drawn with respect to each AR object OBJ1~3.

FIG. 5C shows the image 131V3 displayed in display unit 131 in FIG. 5A, drawn with respect to display unit 131. In other words, it shows the image displayed in display unit 131 as seen from the user U1 who tilts his/her head.

When user U1 tilts his/her head to the right, the display unit 131 and visible range 131*v* of the HMD 100 attached to the head of user U1 also tilt to the right, but each AR object OBJ1~3 placed in the virtual space S1 maintains its posture based on the gravity direction g of the virtual world S1 to produce a state of immersion in the virtual world. For this reason, as shown in FIG. 5C, each AR object OBJ1~3 and additional object OBJM displayed on the display unit 131 are tilted to the left side, opposite to the right side direction where user U1 tilted his/her head. This allows the objects themselves to appear fixed even when the user U1 tilts his/her head, giving the user the impression that they are actually present in the virtual world.

Figure 6A:
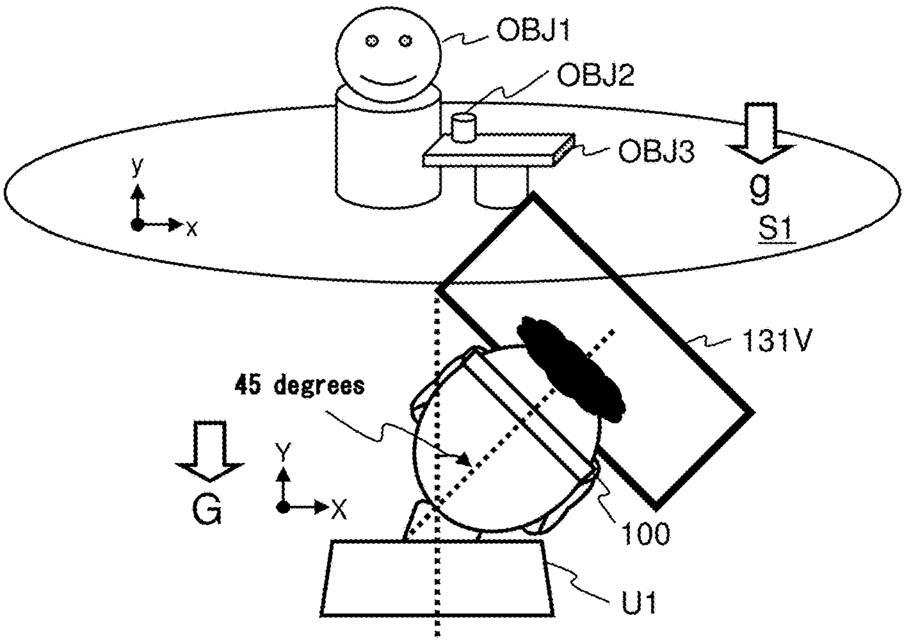
FIG. 6A is a conceptual diagram illustrating the visibility of the virtual space by the HMD when the user's head is tilted 45 degrees in Example 1.
Figure 6B:
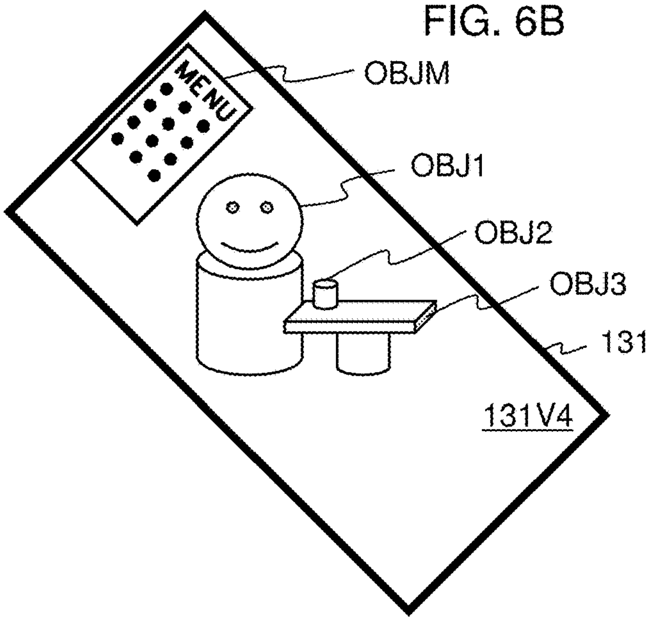
FIG. 6B illustrates the image displayed on the display unit of the HMD with respect to the AR object in the state shown in FIG. 6A.
Figure 6C:
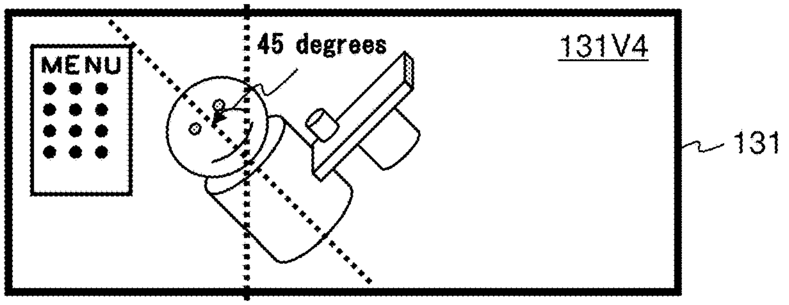
FIG. 6C illustrates the image displayed on the display unit with respect to the display unit of the HMD in the state shown in FIG. 6A.

FIG. 6A, FIG. 6B, and FIG. 6C are conceptual diagrams illustrating the visibility of the virtual space by the HMD when the user's head is tilted 45 degrees in this example.

In FIG. 6A, FIG. 6B, and FIG. 6C, the same configurations as in FIG. 5A, FIG. 5B, and FIG. 5C are marked with the same codes and their descriptions are omitted. In FIG. 6A, the user U1 tilts his/her head further to the right, 45 degrees from the state shown in FIG. 5A. In other words, the HMD 100 is rotated 45 degrees clockwise in the XY plane of real space.

FIG. 6B and FIG. 6C show the same display in display unit 131 as in FIG. 5B and FIG. 5C. In FIG. 6B and FIG. 6C, the difference from FIG. 5B and FIG. 5C is that the additional object OBJM differs from the AR object OBJ1~3 in that the tilt is the same as the user's head, and the additional object OBJM is displayed facing the user.

In this example, the predetermined value of the user's head tilt angle is set to 40 degrees. If the value is less than 40 degrees, as shown in FIG. 5C, both AR object OBJ1~3 and additional object OBJM are displayed on the display 131 in a tilted state according to the head tilt. On the other hand, if the angle is 40 degrees or more, as shown in FIG. 6C, additional object OBJM, unlike AR objects OBJ1-3, will have the same tilt as that of the user's head and will be displayed as if it is facing the user U1 who has tilted his/her head.

This is because a large difference between the tilt of the user's head and the tilt of the additional object makes the additional object difficult to read. In this example, the predetermined value of the tilt angle is set at 40 degrees, and when the tilt angle of the head is 40 degrees or more, the tilt of the additional object is the same as that of the user's head. This has the effect of making the additional object easier to read if the additional object is a text, etc. The predetermined value of the tilt angle is preferable to be around 30~40 degrees in maximum. The predetermined value of the tilt angle may be 0 degrees. In other words, the additional object OBJM may always be the same tilt as the user's head tilt and may be displayed as if it were facing the user U1 who has tilted his/her head. The predetermined value of the tilt angle may be changed by the user setting.

Figure 7:
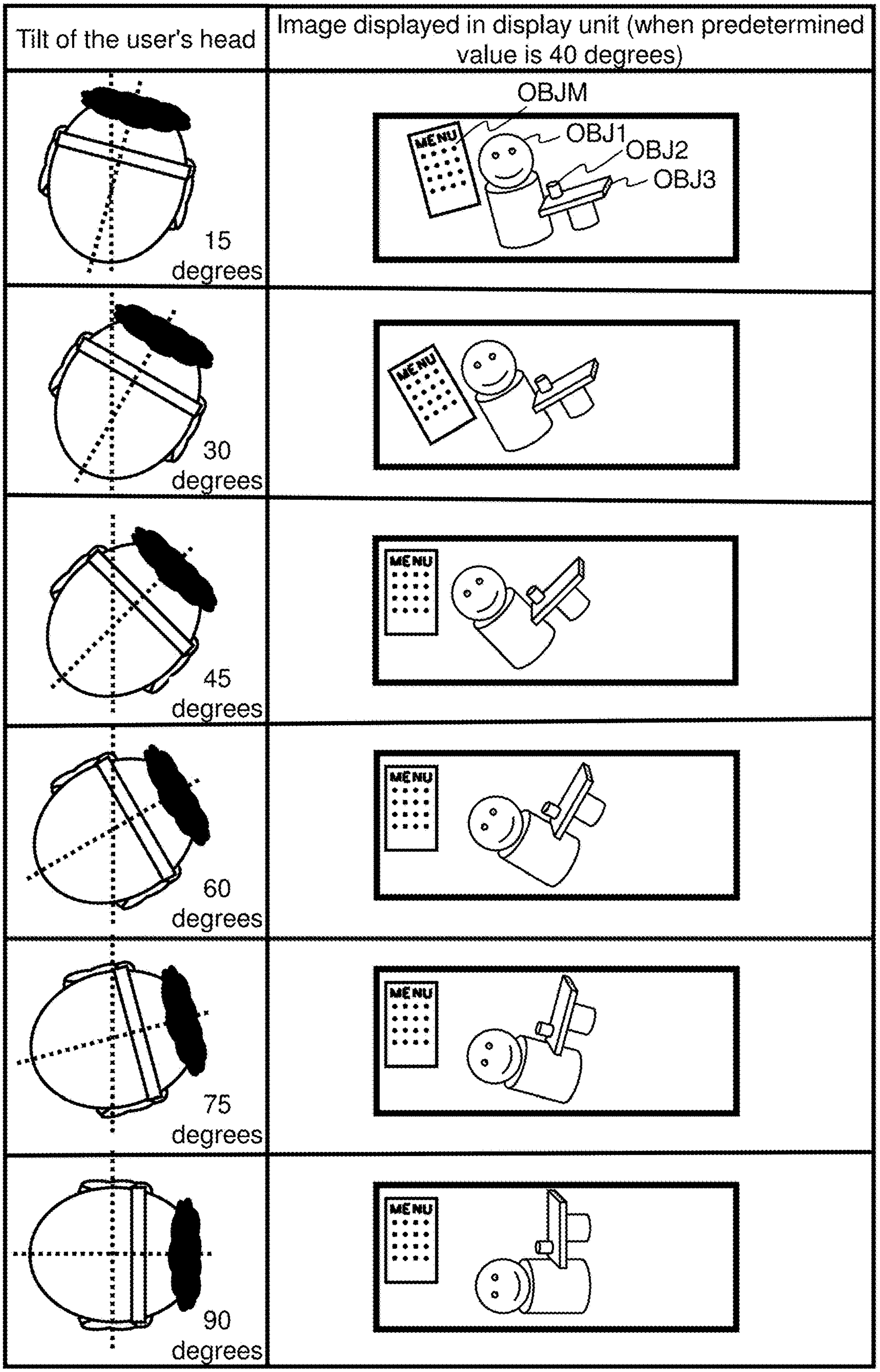
FIG. 7 shows the relationship between the user's head tilt angle and the image displayed on the display unit in Example 1.

FIG. 7 shows the relationship between the tilt angle of the user's head and the image displayed in the display unit in this example. FIG. 7 shows how AR objects and additional objects are displayed on the display when the user's head tilt angle is changed in increments of 15 degrees, and the predetermined value of the tilt angle is set to 40 degrees.

As shown in FIG. 7, at tilt angles of 15 and 30 degrees, which are less than 40 degrees of predetermined value, AR objects OBJ1~3 and additional object OBJM are displayed in the same way, tilted to the left side, opposite to the right side where the user's head is tilted. On the other hand, for tilt angles of 45 to 90 degrees, which are predetermined values of 40 degrees or more, AR objects OBJ1~3 are displayed tilted to the left, opposite to the right direction of the head tilt, while additional object OBJM is displayed with the same tilt as that of the head tilt, i.e., tilted to the right as seen from the user who tilted his head.

Figure 8:
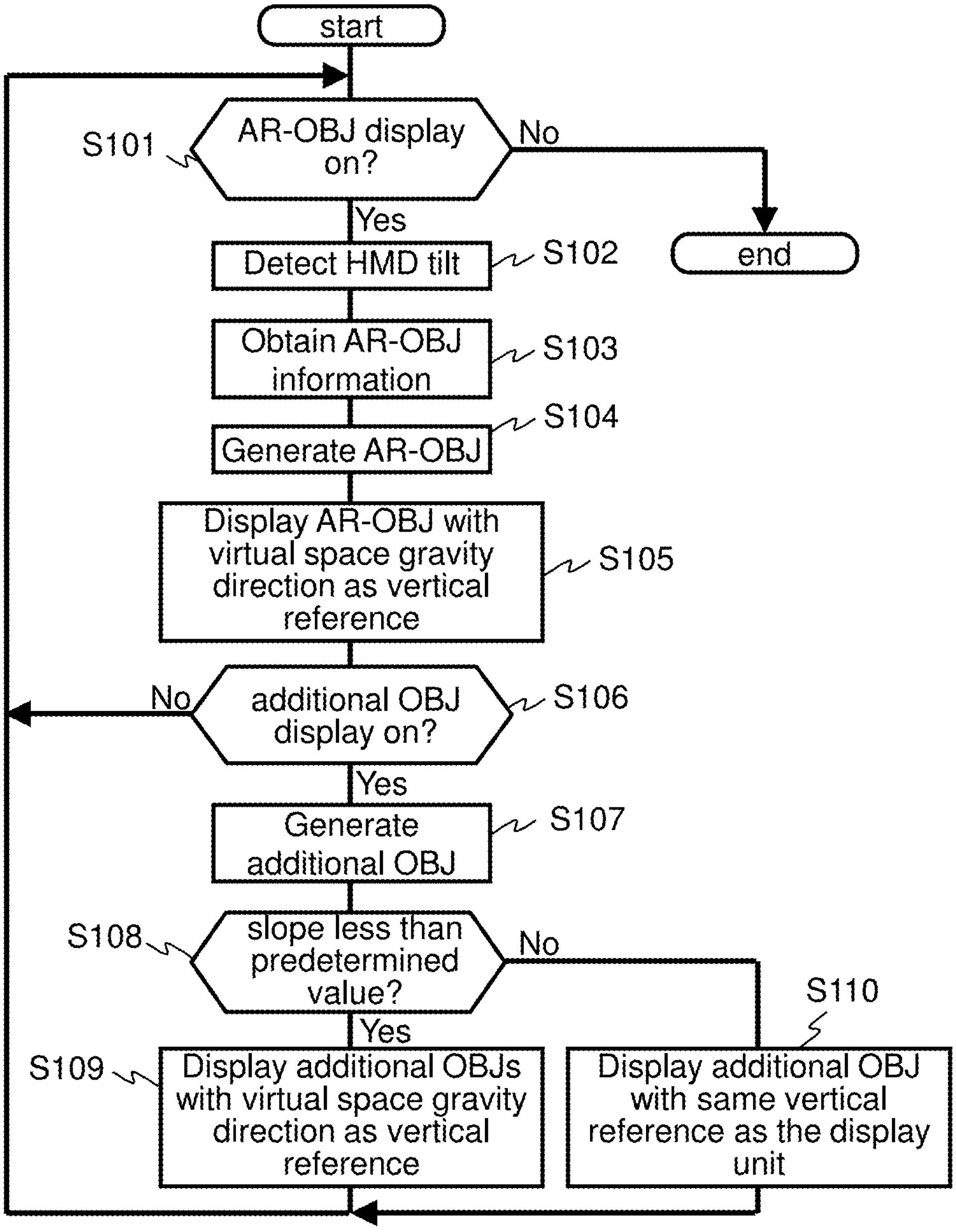
FIG. 8 is a flowchart of the object display control process in Example 1.

FIG. 8 is a flowchart of the object display control processing in this example. In FIG. 8, first, in step S101, the display control unit 1114 checks whether or not the HMD 100 is in the AR object display On mode. If it is in the AR object display On mode, the process proceeds to step S102. If it is not in the AR object display On mode, the process ends.

In step S102, the posture detection unit 1112 detects the position and direction of the HMD 100 in real space and the tilt of the HMD 100. The tilt of the HMD 100 is the angle of the vertical direction of the display 131 relative to the vertical direction in the plane parallel to the display 131. In other words, it is the angle of the vertical axis of the head to the vertical direction in the plane parallel to the display unit 131, which is 0° when the head is upright.

Then, in step S103, the object data acquisition unit 1111 acquires information about the AR object to be placed in the virtual space S1 from the server device on the network, and in step S104, the object data acquisition unit 1111 generates an AR object to be displayed on display unit 131.

In step S105, the display control unit 1114 displays the AR object generated in the process of S104 on the display unit 131. The AR object displayed here is displayed with the gravity direction g of the virtual space as the vertical reference, regardless of the tilt of the HMD 100 detected in the process of S102. In other words, the AR object is displayed so that it maintains its posture based on the gravity direction g of virtual space S1. In other words, the AR object is rotated so that it is tilted in the opposite direction by the same amount as the tilt of the HMD 100 detected in S102.

Next, in step S106, the additional object generation unit 1113 checks whether or not the HMD 100 is in the additional object display On mode. If the HMD 100 is in the additional object display On mode, the HMD 100 proceeds to the process of step S107. If the HMD 100 is not in the additional object display On mode, the HMD 100 returns to the process of step S101.

In step S107, the additional object generation unit 1113 generates additional objects related to the AR object generated in S104.

Then, in step S108, it is checked whether the inclination of the HMD 100 with respect to the vertical direction detected in the process of S102 is less than a predetermined value. If the tilt in the vertical direction is less than the predetermined value, the process proceeds to step S109. If the inclination of the HMD 100 in the vertical direction is not less than the predetermined value, the processing proceeds to step S110.

In step S109, the display control unit 1114 displays the additional object generated in S107 using the gravity direction g of the virtual space as the vertical reference, regardless of the tilt of the HMD 100 detected in the S102 process. That is, the additional object is displayed in the same way as the AR object displayed in S105, i.e., tilted in the opposite direction by the same amount as the tilt of the HMD 100 detected in S102.

In step S110, the display control unit 1114 displays the additional object generated in S107 with the same vertical reference as the display unit 113. In other words, the additional object is displayed so that it is not tilted in the display unit 131.

FIG. 9A and FIG. 9B illustrate the additional object display control in this example. FIG. 9A shows user U1 with his/her head tilted to the right (clockwise direction) by α degrees. That is, α is the tilt angle of user U1's head in relation to the vertical direction, which is the direction of gravity G in real space, and shows the case where HMD 100 is rotated clockwise by a degrees in the XY plane of the real space.

FIG. 9B is a table summarizing the display control of AR objects and additional objects according to the user's head tilt α in this example in the state of FIG. 9A.

In FIG. 9B, if the inclination α of the user's head, i.e., the inclination α of the HMD, is 0≤α<predetermined value, the AR object is displayed based on the gravity direction g of the virtual space S1, regardless of the inclination of the HMD 100. Similarly, the additional object is displayed based on the gravity direction g of the virtual space S1, regardless of the inclination of the HMD 100.

On the other hand, if the HMD inclination α is predetermined value≤α, the AR object is similarly displayed based on the gravity direction g of the virtual space S1, regardless of the inclination of the HMD 100. The additional object is displayed in accordance with the tilt of HMD 100 so that the relative tilt difference from HMD 100 is 0.

As described above, according to this example, in order to produce a state of immersion in the virtual world, the AR object, which is the main image, is tilted according to the tilt angle of the user's head, or the tilt angle of the display unit, but the additional objects such as menu displays are not tilted. This enables to provide an easy-to-use information display device and display method that makes it possible to easily view menu displays, etc., even when the display unit is tilted.

Example 2

This example describes a variant of the display control of the additional object when the user tilts his/her head.

FIG. 10 illustrates the display control of AR objects and additional objects according to the user's head tilt α in this example.

In FIG. 10, assuming that user U1 tilts his/her head to the right (clockwise) by a degrees as in FIG. 9A, when multiple predetermined values are set such that predetermined value 1<predetermined value 2<predetermined value 3< . . . <predetermined value n, and if the HMD inclination α is 0α<predetermined value 1, then the AR object is displayed with respect to the direction of gravity g in the virtual space S1, regardless of the inclination of the HMD 100. The additional object is displayed with an inclination of (predetermined value 1÷2) with respect to the vertical direction. For example, if the predetermined value 1 is 30 degrees and α is 0≤α<30, then the additional object is displayed with an inclination of (30÷2)=15 degrees.

If the tilt α of the HMD is predetermined value 1≤α<predetermined value 2, the AR object is displayed based on the gravity direction g of the virtual space S1, regardless of the tilt of the HMD 100. On the other hand, the additional object is displayed with an inclination of [predetermined value 1+{(predetermined value 2−predetermined value 1)/2}] with respect to the vertical direction. For example, if the predetermined value 1 is 30 degrees and the predetermined value 2 is 60 degrees, if α is 30≤α<60, the additional object is displayed with a slope of [30+{(60−30)÷2}]=45 degrees.

Similarly, if the tilt α of the HMD is predetermined value 2≤α<predetermined value 3, the AR object is displayed based on the gravity direction g of virtual space S1, regardless of the tilt of the HMD 100. On the other hand, the additional object is displayed with an inclination of [predetermined value 2+{(predetermined value 3−predetermined value 2)/2}] with respect to the vertical direction. For example, if the predetermined value 2 is 60 degrees and the predetermined value 3 is 60 degrees, the and α is 60≤α<90, the additional object is displayed with a slope of [60+{(90−60)÷2}]=75 degrees.

Finally, if the tilt α of the HMD is predetermined value n≤α≤180, the AR object is displayed based on the gravity direction g of the virtual space S1, regardless of the tilt of the HMD 100, but the additional object is displayed with an inclination of [predetermined value n+{(180−predetermined value n)/2}] with respect to the vertical direction.

Thus, in this example, the additional object is displayed with a gradual angular tilt according to the tilt α of the user's head, i.e., the tilt α of the display unit of the HMD.

This allows the difference between the tilt of the user's head and the tilt of the additional object to be kept to a minimum without increasing the difference between the tilt of the AR object and the additional object. It also has the effect of preventing the display of additional objects from fluctuating in detail in conjunction with small changes in the tilt of the user's head, creating a state of immersion in the virtual world and, when the additional objects are text, etc, making it easier to read.

Example 3

This example describes a further variation of the display control of the additional object when the user tilts his/her head.

Figure 11A:
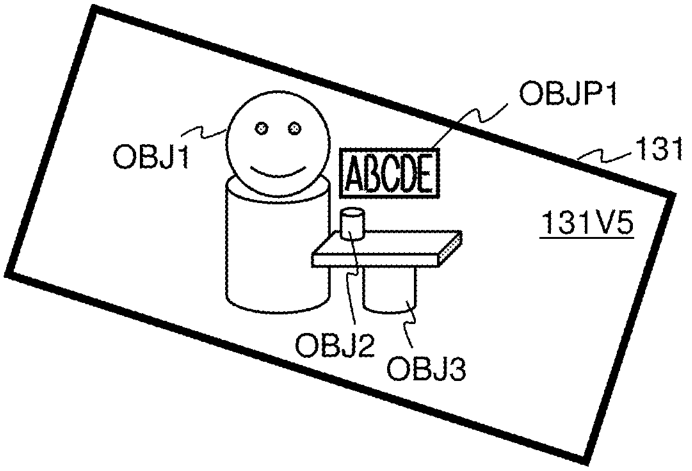
FIG. 11A illustrates the image displayed on the display unit of the HMD when the user wearing the HMD in Example 3 tilts his/her head to the right.
Figure 11B:
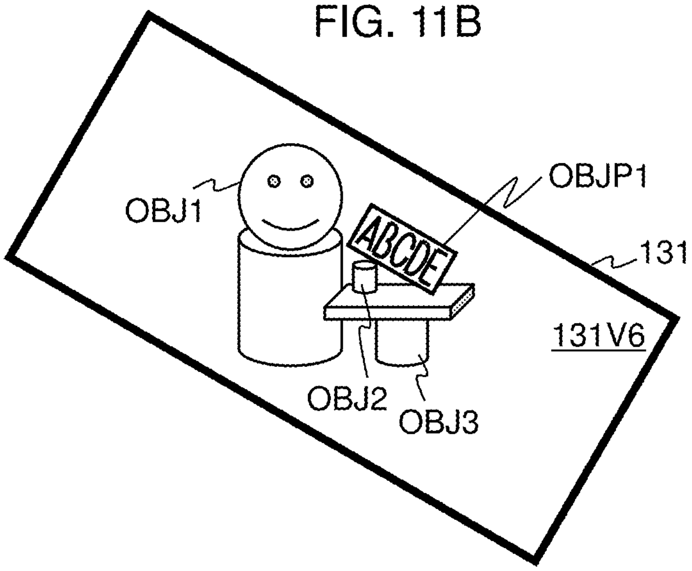
FIG. 11B illustrates the image displayed on the display unit when the user's head is tilted further to the right from the state shown in FIG. 11A and the user's head tilt exceeds the predetermined value.
Figure 11C:
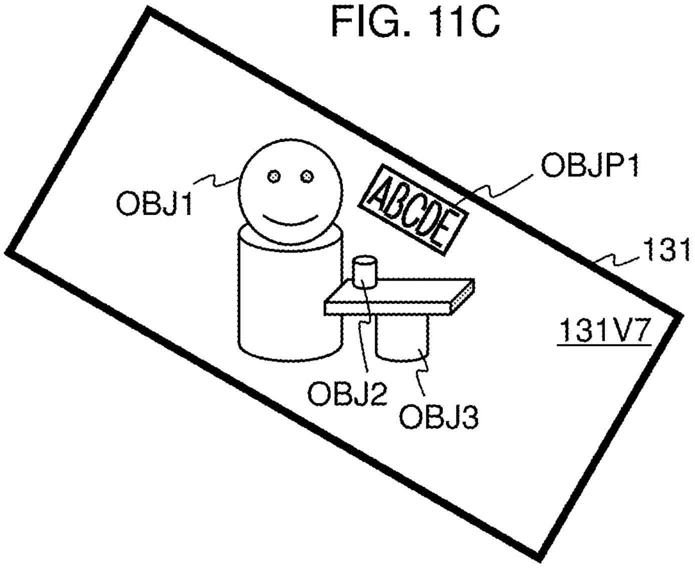
FIG. 11C illustrates the additional object display control in Example 3.

FIG. 11A, FIG. 11B, and FIG. 11C illustrate the image displayed on the display unit of the HMD when the user wearing the HMD in this example tilts his/her head to the right (clockwise direction).

In FIG. 11A, image 131V5 is displayed on the display unit 131 of the HMD. The image 131V5 shows AR object OBJ1~3 as in FIG. 4A, and additional object OBJP1, which is an explanatory pop-up about the AR object (for example, a figure, table, or comment explaining AR object OBJ2). In FIG. 11A, the user's head inclination is less than the predetermined value, and the additional object OBJP1 is also kept based on the gravity direction of the virtual space S1.

FIG. 11B shows the case where the user's head is tilted further to the right from the state of FIG. 11A, and the tilt of the user's head becomes higher than the predetermined value. In FIG. 11B, since the user's head tilt has exceeded a predetermined value, additional object OBJP1 is displayed with the same vertical reference as the HMD by the display control described in Example 1. However, since AR objects OBJ1~3 maintain their alignment based on the gravity direction of virtual space S1, as shown in FIG. 11B, the display of AR object may overlap with that of additional object OBJP1.

In this example, as shown in FIG. 11C, additional object OBJP1 is moved to a position where it does not overlap with the display of each AR object in order to eliminate the overlap between the display of additional object OBJP1 and each AR object in the state shown in FIG. 11B. In other words, not only a rotating processing as in Example 1, but also a moving processing is performed for the additional object at the same time. This makes menu displays, etc. easier to see, even when the user tilts his/her head.

In the above process, the additional object OBJP1 may be moved to a position at a predetermined distance in a predetermined direction. Alternatively, the display control unit 1114 can determine the area occupied by each AR object in the display unit 131 based on the shape of each AR object. Therefore, the additional object OBJP1 may be moved to a position avoiding the area occupied by each AR object in the above display unit 131.

In addition, when the above process of moving the additional object OBJP1 is performed, in order to prevent the position of the destination of the additional object from fluctuating in detail in conjunction with small changes in the inclination of the user's head, the relative positional relationship between the additional object destination and the AR object may be fixed when the change in the inclination of the user's head is minute. This enables to prevent the viewability of the additional object from being impaired even when the user's head moves slightly.

As described above, according to this example, when the user tilts his/her head, i.e., tilts the display unit, the AR object is tilted according to the tilt angle of the user's head, i.e., the tilt angle of the display unit, and additional objects such as menu displays are not tilted, but are moved to a position where they do not overlap the AR object. This enables the menu display, etc. to be more easily viewed and provides an information display device and its display method that is more user-friendly.

Although the examples have been described, the invention is not limited to the above examples, but include various variations. For example, in the examples, an HMD is used as an information display device. However, the invention is not limited to HMDs, but can also be applied to information display devices, such as smartphones, in which the angle of the display screen can be changed in the vertical direction.

In addition to the process of tilting objects according to the tilt angle of the user's head or the tilt angle of the display unit, the user may be able to select to fix the tilt of the object using the operation input unit. For example, if the user selects to fix the display when the AR object and the additional object are tilted according to the tilt of the display unit, the display will continue at the selected tilt, regardless of the subsequent tilt of the display unit. Some users may not like to have the object rotation process follow the tilt of the display area. Therefore, the user's usability can be improved by allowing the user to select the fixation of the display.

The functions of the invention described in the examples are described as being realized in software by a CPU or the like interpreting and executing an operation program that realizes the respective functions, etc. However, some or all of them may be realized in hardware by, for example, designing an integrated circuit, a general-purpose processor, or a specific-purpose processor. A processor includes transistors and other circuits and is considered circuitry or processing circuitry. Hardware and software may also be used together. In addition, some or all of each function may be realized by a server. The server may be a local server, a cloud server, an edge server, a network service, or any other type of server, as long as it is capable of executing functions in conjunction with other components via communication. The information such as programs, tables, and files that realize each function may be stored in memory, hard disks, SSD (Solid State Drive), or other storage devices, IC cards, SD cards, DVDs, or other storage media, or in devices on communication networks.

The programs described in each processing example may be independent programs, or multiple programs may comprise a single application program, and the order in which each process is performed may be swapped.

The above examples are described in detail in order to explain the invention in an easy-to-understand manner, and are not necessarily limited to those having all the described configurations. It is also possible to replace some of the configurations in one example with configurations in another example, and it is also possible to add to one example. It is also possible to add, delete, or replace some of the configurations of each example with other configurations.

REFERENCE SIGNS LIST

100: HMD (head mounted display device), 101: main control unit, 103: RAM, 110: storage unit, 120: operation input unit, 130: image processing unit, 131: display unit, 131V: visible range, 140: audio processing unit, 150: location information acquisition unit, 160: sensor unit, 170: communication unit, 180: extended interface unit, 1001: basic operation program, 1002: application, 1009: various data storage areas, 1101: basic operation function unit, 1111: object data acquisition unit, 1112: posture detection unit, 1113: additional object generation unit, 1114: display control unit, 1199: temporary storage area, U1: user, S1: virtual space, OBJ1~3: AR object, OBJM, OBJP1: additional object

The invention claimed is:

1. An information display device having a display unit comprising:

an object data acquisition unit that acquires information about an AR object and generates the AR object to be displayed on the display unit based on the acquired information, an additional object generation unit that generates an additional object, which is additional information related to the AR object generated by the object data acquisition unit, a posture detection unit that detects a tilt of the information display device relative to a gravity direction of a real space, a display control unit that controls the display of the AR object and the additional object in the display unit based on the gravity direction set in a virtual space in which the AR object is placed and the tilt of the information display device, wherein the display control unit displays the AR object to be tilted on the display unit according to the tilt of the information display device, displays the additional object so that it is tilted on the display unit in accordance with the tilt of the information display device when the tilt of the information display device is less than a predetermined value, and displays the additional object on the display unit without tilting it, using a same vertical reference as the display unit, regardless of the tilt of the information display unit when the tilt of the information display unit is above the predetermined value.

2. The information display device according to claim 1, wherein the display control unit displays the additional object on the display unit with a gradual angle tilt according to the tilt of the information display device.

3. The information display device according to claim 2, wherein when a predetermined value 1<a predetermined value 2, the display control unit displays the additional object on the display unit with a slope of (the predetermined value 1÷2) in response to that a slope $\alpha$ of the information display device is $0 \leq \alpha <$the predetermined value 1, and displays the additional object on the display unit with a slope of [(the predetermined value 1+{(the predetermined value 2−the predetermined value 1)÷2}] in response to that the slope $\alpha$ is the predetermined value $1 \leq \alpha <$the predetermined value 2.

4. The information display device according to claim 1, wherein the display control unit moves the additional object to a position where it does not overlap with the AR object.

5. The information display device according to claim 1, wherein the information display device is a head mounted display device, the tilt of the information display device is a tilt angle of a head of a user wearing the head mounted display device, the control of displaying the information display device tilted on the display unit in response to the tilt of the information display device is a control of displaying on the display unit tilted in an opposite direction by a same amount as the tilt angle of the head, the control of displaying the additional object so that it is not tilted to the display unit regardless of the tilt of the information display device is a control of displaying the additional object so that the additional object is tilted at a same tilt as the tilt of the head and is directly facing the user when viewed from the user.

6. A display method for an information display device having a display unit comprising:

obtaining information about an AR object and generating the AR object based on the obtained information, generating an additional object that is additional information related to the generated AR object, detecting a tilt of the information display device relative to a gravity direction in a real space, displaying the AR object so that the AR object is tilted on the display unit in accordance with the tilt of the information display device, displaying the additional object so that the additional object is tilted to the display unit according to the tilt of the information display device when the tilt of the information display device is less than a predetermined value, displaying the additional object on the display unit without tilting it, using a same vertical reference as the display unit, regardless of the tilt of the information display unit when the tilt of the information display unit is above the predetermined value.

7. The display method according to claim 6, wherein the additional object is displayed on the display unit with a gradual angle tilt according to the tilt of the information display device.

8. The display method according to claim 7, wherein when a predetermined value 1<a predetermined value 2, the additional object is displayed on the display unit with a slope of (the predetermined value 1÷2) in response to that a slope $\alpha$ of the information display device is $0 \leq \alpha <$the predetermined value 1, and the additional object is displayed on the display unit with a slope of [(the predetermined value 1+{(the predetermined value 2−the predetermined value 1)÷2}] in response to that the slope ais the predetermined value $1 \leq \alpha <$the predetermined value 2.

9. The display method according to claim 6, wherein the additional object is moved to a position where it does not overlap with the AR object.

10. The display method according to claim 6, wherein the information display device is a head mounted display device, the tilt of the information display device is a tilt angle of a head of a user wearing the head mounted display device, the control of displaying the information display device tilted on the display unit in response to the tilt of the information display device is a control of displaying on the display unit tilted in an opposite direction by a same amount as the tilt angle of the head, the control of displaying the additional object so that it is not tilted to the display unit regardless of the tilt of the information display device is a control of displaying the additional object so that the additional object is tilted at a same tilt as the tilt of the head and is directly facing the user when viewed from the user.

11. An information display device comprising:

a display, a sensor configured to detect a tilt of the information display device, and a processor, wherein the processor is configured to:

generate an AR object and an additional object that is additional information related to the AR object, control the AR object and the additional object to be displayed on the display so that they are tilted according to a tilt of the information display device when the tilt of the information display device detected by the sensor is less than a predetermined value, control the AR object to be displayed on the display so that it is tilted in accordance with the tilt of the information display device when the tilt of the information display device detected by the sensor is greater than or equal to the predetermined value, and control the additional object to be displayed on the display without being tilted regardless of the tilt of the information display device.

12. The information display device according to claim 11, wherein the additional object consists of text.

13. The information display device according to claim 11, wherein the AR object is an object representing a person or an object, and the additional object is an object representing a menu containing text.

14. The information display device according to claim 11, further comprising:

an interface that a user uses for an operation of setting the predetermined value.

* * * * *